US009719777B1

(12) United States Patent
Colonna de Lega et al.

(10) Patent No.: US 9,719,777 B1
(45) Date of Patent: Aug. 1, 2017

(54) INTERFEROMETER WITH REAL-TIME FRINGE-FREE IMAGING

(71) Applicant: Zygo Corporation, Middlefield, CT (US)

(72) Inventors: Xavier Colonna de Lega, Middlefield, CT (US); Jan Liesener, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 165 days.

(21) Appl. No.: 14/723,803

(22) Filed: May 28, 2015

Related U.S. Application Data

(60) Provisional application No. 62/005,434, filed on May 30, 2014.

(51) Int. Cl.
*G01B 9/02* (2006.01)
*G01B 11/24* (2006.01)

(52) U.S. Cl.
CPC ...... *G01B 11/2441* (2013.01); *G01B 9/02087* (2013.01)

(58) Field of Classification Search
CPC ................. G01B 11/2441; G01B 9/02087
See application file for complete search history.

(56) References Cited

U.S. PATENT DOCUMENTS

| 6,384,899 B1* | 5/2002 | den Boef | G03F 7/70716 355/53 |
| 7,068,376 B2 | 6/2006 | de Groot | |
| 2010/0128276 A1* | 5/2010 | De Groot | G01B 11/2441 356/450 |
| 2010/0128278 A1* | 5/2010 | Deck | G01B 11/2441 356/477 |
| 2011/0317169 A1* | 12/2011 | Lin | G01B 11/2441 356/511 |
| 2014/0226150 A1 | 8/2014 | Colonna de Lega | |

OTHER PUBLICATIONS de Groot, "Coherence Scanning Interferometry", *Optical Measurement of Surface Topography*, 1$^{st}$ Edition, pp. 187-208 (Springer Verlag, Berlin) (2011).
de Groot, "Generating fringe-free images from phase shifted interferometry data", *Applied Optics*, vol. 44, No. 33, pp. 7062-7069 (Nov. 20, 2005).
Pluta, *Advanced Light Microscopy*, vol. 3: Measuring Techniques (Elsevier, Amsterdam), pp. 341-341 (1993).
Schmit et al., "High-precision interferometric shape measurement of objects with areas of different reflectance", *Proceedings of SPIE*, vol. 4275, pp. 85-93 (2001).

* cited by examiner

*Primary Examiner* — Hwa Lee
(74) *Attorney, Agent, or Firm* — Fish & Richardson P.C.

(57) ABSTRACT

Methods include: directing test light and reference light along different optical paths, where a test object is in a path of the test light; forming an image of the test object on a multi-element detector by directing test light from the test object to the detector; overlapping the reference light with the test light on the detector; detecting an intensity of the overlapped test and reference light with the detector, the intensity being detected at a frame rate; and modulating an optical path difference (OPD) between the test and reference light at the detector while detecting the light intensity. The OPD is modulated at a rate and amplitude sufficient to reduce a contrast of fringes in a spatial interference pattern formed by the light at the detector over a frame of the detector. Accordingly, fringe-free images may be acquired real-time.

24 Claims, 11 Drawing Sheets

INTERFEROMETER WITH REAL-TIME FRINGE-FREE IMAGING

CROSS-REFERENCE TO RELATED APPLICATIONS

This application claims priority to Provisional Application No. 62/005,434, entitled "INTERFEROMETER WITH REAL-TIME FRINGE-FREE IMAGING," filed on May 30, 2014, the entire contents of which are incorporated herein by reference.

BACKGROUND

Interferometers (e.g., interferometric surface profilers) are versatile tools used for research, development and process or quality control in industrial environments. They provide metrological or quantitative information about the sample objects, including form, roughness, texture, material properties, etc.

Interferometers generally include an actuator for varying the optical path in an interferometric cavity, for example a PZT-mounted mirror or beamsplitter, or an actuated flexure that moves a subset of the optical system with respect to the sample under test. Other instruments rely on shifting the frequency of the light source to achieve similar effects.

The operator of a typical commercial interferometric surface profiler generally needs some knowledge and understanding of the interference pattern that appears overlaid with the image of the sample, as detected by the instrument. The interferometric information is useful in many ways, for example for optimizing the orientation of the part with respect to the instrument (adjustment of tip and tilt) and/or for finding a proper measurement position by maximizing the contrast of the interference pattern seen on a display.

However, there are also cases where the presence of the interference fringes is undesirable, for example when looking for a measurement position on a sample that is very dim or has complex lateral features. In the first case the light coming from the interferometer reference leg can wash out sample features in the image and in the limit case render it invisible. In the second case, the beat between fringe pattern and object spatial features can create a confusing picture. In such instances it is beneficial for the user to be able to switch the instrument to a "fringe-free" mode where the modulation of the image due to the interference pattern has been substantially reduced or even entirely suppressed. Such capability is available for certain conventional interferometers (e.g., Michelson interference microscope objectives) that include mechanical shutters.

SUMMARY

The disclosure features a surface topography interferometer equipped to display a real-time "fringe-free" image of a sample to the operator, where the image captured by the detector is devoid of interference fringe modulation, or for which the contrast of the interference pattern is at least substantially reduced. Fringe reduction may be achieved without any additional hardware, such as mechanical or electro-mechanical shutters.

In some embodiments the fringe-free image information is further processed to subtract the light intensity contribution from the interferometer reference leg, resulting in an image with improved contrast compared to the image with the reference light intensity contribution present.

In some embodiments, the instrument collects color information and displays a fringe-free, true-color, high contrast image of the sample. Color information can be collected using a color camera or using a monochrome camera in combination with color filters that allow, e.g., sequential acquisition of images of different color (e.g., a red image, a green image, and a blue image).

In some embodiments, the fringe information is reduced (e.g., eliminated) by modulating the optical path difference in the interferometer cavity on a time scale that is shorter than the integration time of the detector. The modulation can for example be periodic with a saw-tooth, triangular or sinusoidal evolution.

In some embodiments, the optical path difference modulation is introduced in such a way that areas of the sample that are imaged at best-focus onto the detector in the absence of modulation remain in focus when the modulation is applied. For example, the modulation can be sufficiently small so that the surface of the test object remains at or close to the plane of best focus during the entire modulation.

In some embodiments, the optical path modulation is synchronized with the start and end of the detector integration time. The detector frame rate may be the same as the frequency of the optical path modulation. The detector frame rate may be twice the frequency of the optical path modulation.

In some embodiments, the optical path modulation is combined with a modulation of the illumination intensity in the instrument within the detector integration time.

In some embodiments, the optical path modulation and illumination intensity modulation are synchronized.

In some embodiments, the illumination intensity modulation is a sinusoidal or triangular function, or derived from such functions.

In some embodiments, the instrument can near-instantaneously switch from fringe-free display to interferogram display at the user request.

In some embodiments, the image is not entirely fringe free, but has partially or substantially reduced fringe modulation, which is optionally adjustable according to user control (e.g., by changing the amplitude or frequency of the optical path modulation or the intensity modulation).

In some embodiments, the fringe-free image information is further processed to subtract the light intensity contribution from the interferometer reference leg, yielding a quantitative estimate of the sample surface reflectivity when accounting for the light source intensity. This information may then be used to compute optimum light source intensity for performing a metrology data acquisition that takes full advantage of the detector dynamic range while avoiding detector saturation.

Various aspects of the invention are summarized as follows.

In general, in a first aspect, the invention features methods that include: directing test light and reference light along different optical paths, where a test object is positioned in a path of the test light and the test and reference light are derived from a common light source; forming an image of the test object on a multi-element detector by directing test light from the test object to the detector; overlapping the reference light with the test light on the multi-element detector; detecting an intensity of the overlapped test and reference light with the elements of the multi-element detector, the intensity being detected at a frame rate of the multi-element detector; and modulating an optical path difference (OPD) between the test and reference light at the detector while detecting the intensity of the overlapped test and reference light. The OPD is modulated at a rate relative to the frame rate and with an amplitude sufficient to reduce a contrast of fringes in a spatial interference pattern formed by overlapping test and reference light at the multi-element detector over a frame of the multi-element detector.

Implementations of the method can include one or more of the following features. For example, the method can include providing a fringe-free image of the test object based on the detected intensity of the overlapped test and reference light. In some implementations, the method includes providing an image of the test object having a fringe contrast reduced by a factor of 2 or more (e.g., 5 or more, 8 or more, 10 or more, such as a factor of 15 or 20) relative to an image of the test object formed without modulating the OPD between the overlapping test and reference light.

In certain implementations, the image of the test object is a color image. The image can also be a monochrome image. The OPD can be modulated by moving at least one element in an optical apparatus used to direct the test and reference light. For example, the OPD can be modulated by moving an optical element in the path of the test light. The optical element in the path of the test light can be a microscope objective. In some implementations, the OPD is modulated by moving the test object. The OPD can be modulated by moving an optical element in the path of the reference light, such as a reference mirror.

The OPD can be modulated by varying a wavelength of the test and reference light at the detector. For example, the wavelength can be varied by varying a wavelength of light emitted from the common light source.

The OPD can be modulated about 200 nm or more (e.g., about 400 nm or more, about 500 nm or more, about 1 micron or more) during the modulating. The OPD can be modulated about 5 microns or less (e.g., about 2 microns or less) during the modulating.

The OPD can be modulated periodically while detecting the intensity of the overlapping test and reference light. In some implementations, a periodic modulation of the OPD is synchronized with the frame rate. For example, the frame rate can be an integer multiple of a frequency of the periodic modulation of the OPD. The frame rate can be twice the frequency of the periodic modulation of the OPD. The frame rate can be the same as the frequency of the periodic modulation of the OPD.

In some implementations, the OPD is modulated randomly while detecting the intensity of the overlapping test and reference light.

The OPD can be modulated with a saw tooth, sinusoidal or triangular waveform, for example. The method can include modulating an intensity of the test and reference light while modulating the optical path difference between the test and reference light. The intensity of the test and reference light can be modulated by modulating an intensity of the common light source. The intensity can be modulated periodically while detecting the intensity of the overlapping test and reference light. The periodic modulation of the intensity can be synchronized with the frame rate. For example, a frequency of the intensity modulation can be an integer multiple of the frame rate (e.g., .twice the frame rate). In some implementations, a frequency of the intensity modulation is the same as the frame rate.

The periodic modulation of the intensity can be synchronized with a periodic modulation of the OPD. For example, a frequency of the periodic intensity modulation is an integer multiple of a frequency of the periodic OPD modulation. The frequency of the periodic intensity modulation can be twice the frequency of the periodic OPD modulation.

In some implementations, the periodic intensity modulation and the periodic OPD modulation are synchronized so that a maximum rate of change of the OPD modulation corresponds to a maximum intensity. The periodic intensity modulation and the periodic OPD modulation can be synchronized so that a minimum rate of change of the OPD modulation corresponds to a minimum intensity.

Providing the image can include reducing a contribution of the reference light to the image. The contribution of the reference light can be reduced based on predetermined information about the reference light.

The method can include detecting an intensity of the overlapped test and reference light with the elements of the multi-element detector while varying the OPD to acquire an interference signal for each of the detector elements, and determining information about the test object based on the interference signals. The method can include adjusting a level of the common light source prior to acquiring the interference signals. The level of the common light source can be adjusted based on an intensity of the test light at the detector calculated based on the detected intensity of the overlapped test and reference lights and a dynamic range of the multi-element detector.

In general, in a further aspect, the invention features methods for imaging a test object, including: directing test light and reference light along different optical paths, where the test object is positioned in a path of the test light and the test and reference light are derived from a common light source; forming an image of the test object on a multi-element detector by directing test light from the test object to the detector; overlapping the reference light with the test light on the multi-element detector; detecting an intensity of the overlapped test and reference light with the elements of the multi-element detector, the intensity being detected at a frame rate of the multi-element detector; varying an optical path difference (OPD) between the test and reference light at the detector while detecting the intensity of the overlapped test and reference light; and modulating an intensity of the test and reference light at the detector so that the intensity varies over each frame detected by the multi-element detector. The OPD is varied and the intensity modulated such that a contrast of fringes in a spatial interference pattern formed by overlapping test and reference light at the detector is reduced over a frame of the multi-element detector. Implementations of the method can include features of other aspects of the invention.

In general, in yet a further aspect, the invention features methods that include: directing test light and reference light along different optical paths, where a test object is positioned in a path of the test light and the test and reference light are derived from a common light source; forming an image of the test object on a multi-element detector by directing test light from the test object to the detector; overlapping the reference light with the test light on the multi-element detector; detecting an intensity of the overlapped test and reference light with the elements of the multi-element detector, the intensity being detected at a frame rate of the multi-element detector; modulating an optical path difference (OPD) between the test and reference light at the detector while detecting the intensity of the overlapped test and reference light; modulating an intensity of the test and reference light at the detector while detecting the intensity of the overlapped test and reference light; and providing an image of the test object based on the detected intensity of the overlapping test and reference light. The OPD and intensity of the test and reference light are modulated at a rate relative to the frame rate sufficient to reduce, in the image, a contrast of fringes in a spatial interference pattern formed by overlapping test and reference light at the multi-element detector. Implementations of the method can include features of other aspects of the invention.

In general, in another aspect, the invention features interferometry systems that include: a light source module; a stage for supporting a test object; a multi-element detector configured to acquire frames at a frame rate; an imaging interferometer configured to derive test light and reference light from the light source module, and direct the test light and reference light along different optical paths where test light illuminates the test object while supported by the stage, to form an image of the test object on the multi-element detector with the test light, and to overlap the reference light with the test light on the multi-element detector, the imaging interferometer or the stage comprising an actuator configured to modulate an optical path difference (OPD) between the test light and reference light at the multi-element detector; and an electronic controller in communication with the actuator and the multi-element detector, the electronic controller programmed to cause the actuator to modulate the OPD between the test and reference light at the detector while the multi-element detector detects an intensity of the overlapped test and reference light. The OPD modulation is at a rate relative to the frame rate and with an amplitude sufficient to reduce a contrast of fringes in a spatial interference pattern formed by the overlapping test and reference light at the multi-element detector over a frame of the multi-element detector.

Embodiments of the system can include one or more of the following features and/or features of other aspects. For example, the light source module can be in communication with the electronic controller which is programmed to cause the light source module to modulate an intensity of the test and reference light while the actuator modulates the OPD between the test and reference light. The light source module can include a light source and the electronic controller modulates the intensity of the test and reference light by modulating an intensity of light emitted from the light source. The light source may be a broad band light source. The light source may be a solid state light source.

In some embodiments, the light source module includes a light valve and the electronic controller modulates the intensity of the test and reference light by operation of the light valve.

The imaging interferometer can be an interference microscope. The interference microscope can include an objective and the actuator is configured to move the stage relative to the objective. The objective can be a Mirau objective.

The system can include an electronic display in communication with the electronic processor, the system being configured to display an image of the test object based on the detected intensity. The image can be a fringe-free image. The image can be a color image or a monochrome image.

DETAILED DESCRIPTION

Figure 1:
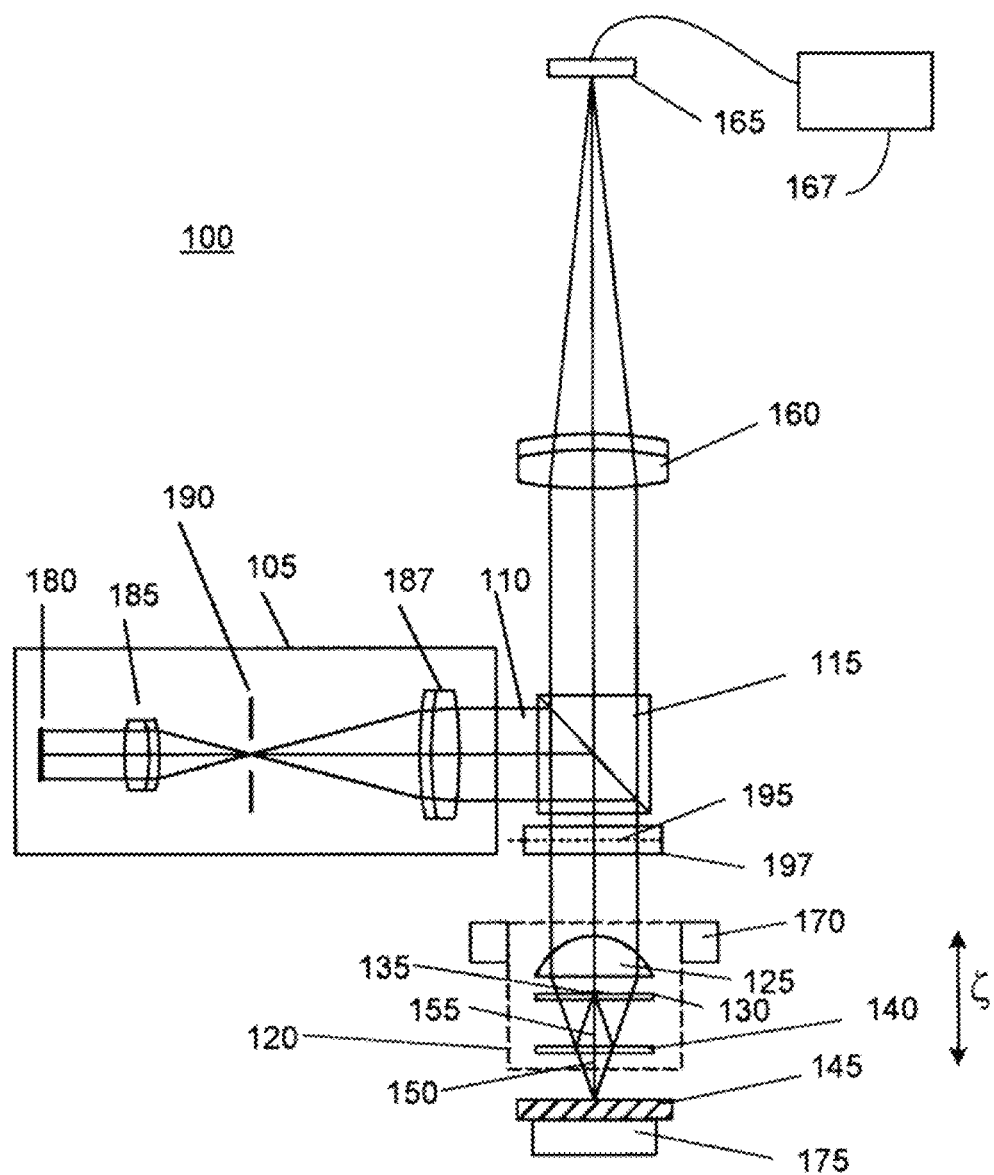
FIG. 1 is a schematic diagram of an interference microscope interferometry system for surface profilometry.

Referring to FIG. 1, an interferometry system 100 includes a source module 105, a beam splitter 115, and a Mirau interferometric objective assembly 120. The source module 105 provides illumination light 110 to beam splitter 115, which directs the illumination light 110 to Mirau interferometric objective assembly 120. The assembly 120 includes an objective lens 125, a reference flat 130 having a reflective coating on a small central portion thereof defining a reference mirror 135, and a beam splitter 140. During operation, the objective lens 125 focuses the illumination light towards a test object 145 through the reference flat 130.

The beam splitter 140 transmits a portion of the focused light to the object 145 to define test light 150. The beam splitter 140 also reflects a portion of the focused light to the reference mirror 135 to define reference light 155. Then, the beam splitter 140 recombines the measurement light 150 reflected (or scattered) from the object 145 with the reference light 155 reflected from the reference mirror 135. The objective 125 and an imaging lens 160 image the combined light to form an interference pattern on a detector 165 (e.g. a multi-element camera, such as a CMOS or CCD camera).

As the relative position of the object 145 is scanned, the detector 165 measures the intensity of the interfering light at one or more pixels of the detector and sends that information to a computer 167 for analysis.

The scanning in the Mirau-type interferometry system 100 involves a piezoelectric transducer (PZT) 170 coupled to the Mirau interferometric objective assembly 120. The PZT 170 is configured to scan the assembly 120 as a whole relative to the object 145 along the optical axis of the objective lens 125 as denoted by the scan coordinate $\zeta$ in FIG. 1. The Mirau-type interferometry system 100 provides scanning interferometry data at each pixel of the detector 165. Alternatively, a PZT may be coupled to the object 145 rather than the assembly 120 to provide the relative motion there between, as indicated by PZT actuator 175. In yet further embodiments, the scanning may be provided by moving one or both of the reference mirror 135 and the beam splitter 140 relative to the objective lens 125 along the optical axis of the objective lens 125.

Source module 105 includes a light source 180 (e.g., a spatially-extended source), a telescope formed by lenses 185 and 187, and an aperture 190 positioned in the front focal plane of the lens 185 (which coincides with the back focal plane of lens 187). This arrangement images the light source 180 onto the pupil plane 195 of the Mirau interferometric objective assembly 120, which is an example of Koehler illumination. Optionally, an optic 197 (e.g., a diaphragm for controlling the numerical aperture of the system) may be positioned at pupil plan 195. The size of the aperture 190 controls the size of the illumination field on the object 145. Source module 105 is exemplary only and other source configurations may be used.

For simplicity, FIG. 1 shows the test light 150 and the reference light 155 focused onto particular points on the test object 145 and the reference mirror 135 (supported on a transparent substrate 130), respectively, and subsequently interfering on a corresponding point on the detector 165. Such light corresponds to those portions of the illumination light 110 that propagate perpendicular to the pupil plane 195 of the Mirau interferometric objective assembly 120. Other portions of the illumination light 110 ultimately illuminate other points on the object 145 and the reference mirror 135, which are then imaged onto corresponding points on the detector 165.

The detector 165 is, for example, a multi-element (i.e., multi-pixel) camera to independently measure the interference between the measurement light 150 and reference light 155 corresponding to different points on the object 145 (i.e., to provide spatial resolution for the interference pattern). The optical resolution of the interferometry system 100 is generally determined by its optical characteristics and the element (i.e., pixel) size of the detector 165.

Because the scanning occurs in a region where the illumination light 110 is being focused onto the object 145, the scan varies the OPD depending on the angle of incidence. As a result, the OPD from the source 201 to the detector 165 between interfering portions of the measurement light 150 and reference light 155 scale differently with the scan coordinate $\zeta$ depending on the angle of the measurement light 150 incident on, and emerging from, the object 145.

This difference in how the OPD varies with the scan coordinate $\zeta$ introduces a limited coherence length of the light measured at each pixel of the detector 165. Thus, the interference signal (as a function of scan coordinate $\zeta$) is typically modulated by an envelope having a spatial coherence length on the order of $\lambda/2(NA)^2$, where $\lambda$ is the nominal wavelength of the illumination light and NA is the numerical aperture of the assembly 120. To increase the limited spatial coherence, the assembly 120 in the scanning interferometry system 100 can define a large numerical aperture NA, e.g., greater than about 0.7 (or more preferably, greater than about 0.8, or greater than about 0.9). The interference signal can also be modulated by a limited temporal coherence length associated with the spectral bandwidth of the illumination source 180. Depending on the configuration of the interferometry system 100, one or the other of these limited coherence length effects may dominate, or they may both contribute substantially to the overall coherence length.

Typically, a phase between the test light and reference light varies over the detector. This can be due to differences in orientation between the surface of the test object and the reference flat 130 and/or due to variations in the height profile of the surface of the test object. This variation in phase generally results in a spatial interference pattern over the detector, which appears as alternating light and dark bands (referred to as fringes) across an image of the test object's surface.

Figure 2:
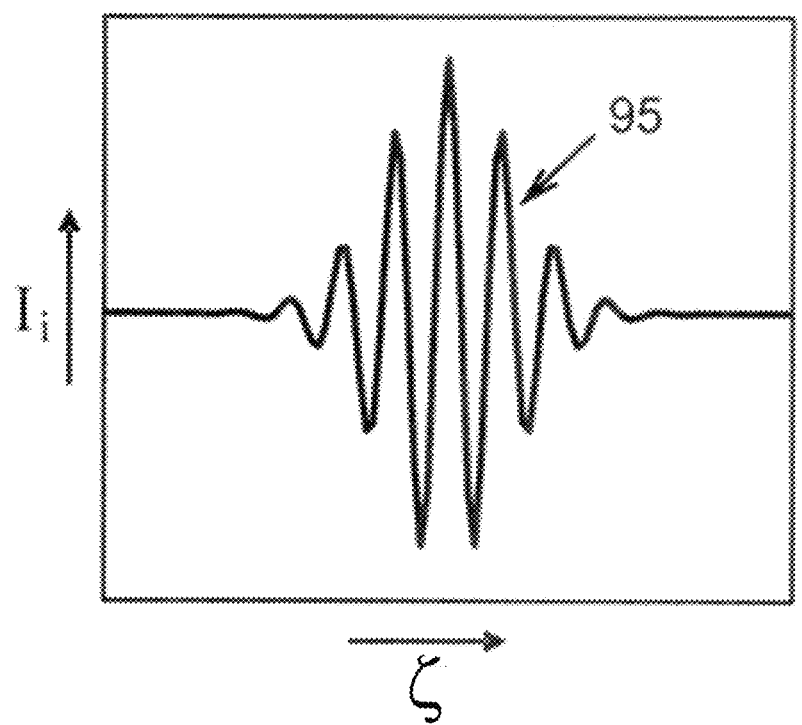
FIG. 2 is a plot showing intensity versus OPD of a low coherence interferometry signal.

A spatial interference pattern is different from an interference signal, which is a signal detected in response to the varying light intensity at a single detector element as the OPD between the test and reference light is scanned. FIG. 2, for example, shows a plot of detected intensity, $I_i$, as a function of scan position for a single element of detector 165. The plot shows a typical low coherence interference signal 95 with sinusoidal interference fringes modulated by a Gaussian envelope at the position of zero OPD between the test and reference light. The width of the Gaussian envelope depends, among other things, on the coherence length of light source 180. In this example, the OPD scan is longer than the coherence length of the source.

In some instances, it is desirable to reduce the contrast of fringes in the spatial interference pattern that is visible in the field of view of interferometer system over some regions of a test object's surface. In some instances, it may be desirable to totally suppress this fringe pattern, providing an image more similar to that provided by a conventional imaging microscope, as opposed to an interference microscope. In general, a reduction of the fringe contrast by a factor of at least 10 (for a high-contrast interferogram) is considered yielding a "fringe-free" image. It is possible to remove the fringes from a spatial interference pattern from an image by blocking the reference light from the detector, e.g., using a mechanical shutter. However, this requires additional components. Moreover, in a Mirau-type objective, for example, the light path of the reference light is not easily accessible. Accordingly, it is desirable to reduce (e.g., remove) fringes in the spatial interference pattern using other techniques, examples of which are described below.

Optical Path Difference Modulation

In some embodiments, the optical path modulation device that is used for acquiring metrology data is also used for the purpose of eliminating the interference fringes from the real-time image. Here, the OPD is modulated at a rate relative to the frame rate of the detector and with an amplitude sufficient to reduce the contrast of fringes in the spatial interference pattern over a frame of the detector. Generally, the amount of reduction in the fringe contrast can vary. In some embodiments, fringe contrast can be reduced 50% or more (e.g., 80% or more, 90% or more, 95% or more, 98% or more).

Modulation may be accomplished for example by moving one part of the interferometer (e.g., reference mirror or interferometric objective) with respect to the test object. Motion is produced using an actuator such as a piezoelectric element (e.g., PZT actuated stage 175 in system 100), a PZT-driven flexure stage, a voice coil, a linear actuator, etc. Alternatively, or additionally, some interferometers collect metrology data by shifting the light source wavelength. The same phenomenon is used in this case to modulate the fringe pattern during collection of real-time data.

Figure 3:
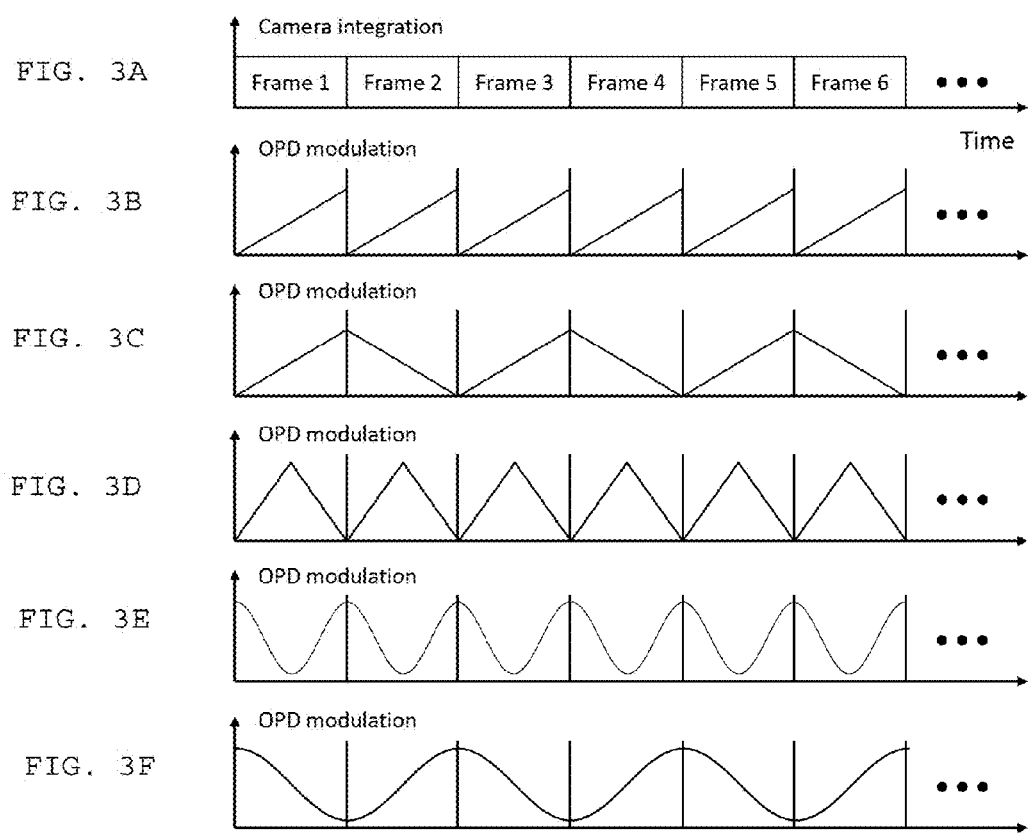
FIGS. 3A-3F show plots of various examples of optical path difference (OPD) modulation profiles applied to eliminate fringe modulation in the images captured by a detector, such as a camera, relative to the detector frame rate (FIG. 3A).

The modulation patterns of the optical path in the interferometer may be cyclical, for example with a saw tooth, triangular or sinusoidal periodic phase modulation, as illustrated in FIGS. 3A-3F. Here, a variety of possible cyclical OPD modulation patterns are shown, synchronized with the integration window of the detector. In particular, the horizontal axis shows time. FIG. 3A shows the camera integration time for 6 equal frames. FIGS. 3B-3F show possible OPD modulation patterns. In certain embodiments, a sinusoidal modulation is used (FIGS. 3E and 3F). In some instances, the frequency of the modulation is the same as the frame rate, e.g., FIGS. 3B, 3D, 3E. In certain embodiments, the frequency of the modulation is half the frame rate, e.g., FIGS. 3C and 3F.

In embodiments where the modulation is achieved by moving the sample with respect to the interferometer, it may be preferable to use modulation amplitudes that are on the order of, or smaller, than the depth-of-focus of the imaging system, such that applying the modulation does not degrade the optical resolution of the instrument. In some embodiments, the modulation amplitude is in a range from about 100 nm to about 10 microns (e.g., about 200 nm, about 500 nm, about 1 micron, about 2 microns, about 5 microns).

Other modulation profiles are also possible. For example, in certain embodiments the optical path modulation is of a random or pseudo-random nature and may rely on the introduction of a wide range of optical paths in the cavity during the detector integration time to achieve fringe contrast reduction.

Source Intensity Modulation

In some embodiments, the optical path modulation described earlier may be combined with a modulation of the light source intensity during detector integration. Specifically, the light intensity may be varied in cyclic fashion that is synchronized with the optical path modulation in order to further reduce fringe contrast relative to performing optical path modulation at constant light intensity. In general, the amplitude of the intensity variation may vary as desired. The intensity may be varied, for example, between a minimum that is zero intensity and a maximum that corresponds to a maximum intensity of the light source.

Figure 4:
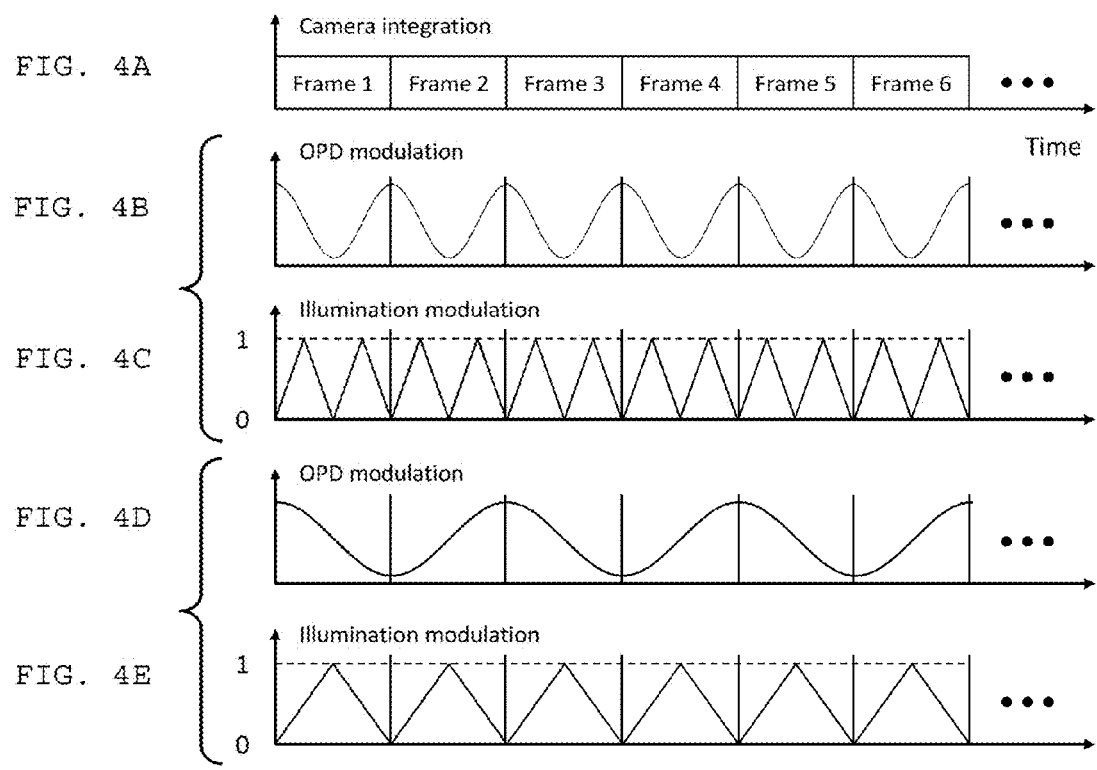
FIGS. 4A-4E show plots of examples of triangular source intensity modulation patterns (FIGS. 4C and 4E), synchronized with the sinusoidal modulation of the optical path (FIGS. 4B and 4D), respectively, relative to the detector frame rate (FIG. 4A).

In some embodiments, the intensity illumination is chosen so that the time intervals where the optical path changes the fastest in the interferometer are given heavier weight in the signal integrated by the detector. In other words, the illumination intensity is highest at the times that the slope of the optical path modulation is steepest and the illumination intensity is lowest when the slope of the optical path modulation is lowest (i.e., when the modulated components are momentarily stationary). FIGS. 4A-4E and FIGS. 5A-5E show the timing of triangular and sinusoidal intensity modulation patterns, respectively, that are optimally synchronized with different types of sinusoidal cavity modulation patterns. FIG. 4A shows the camera integration time for 6 equal frames. FIG. 4B show a sinusoidal optical path modulation having a frequency that is the same as the camera frame rate, while FIG. 4C shows a triangular intensity modulation that has twice the frequency of the frame rate. FIG. 4D shows an optical path modulation having half the frequency of the frame rate, while FIG. 4E shows a triangular intensity modulation that has the same frequency as the frame rate.

Figure 5:
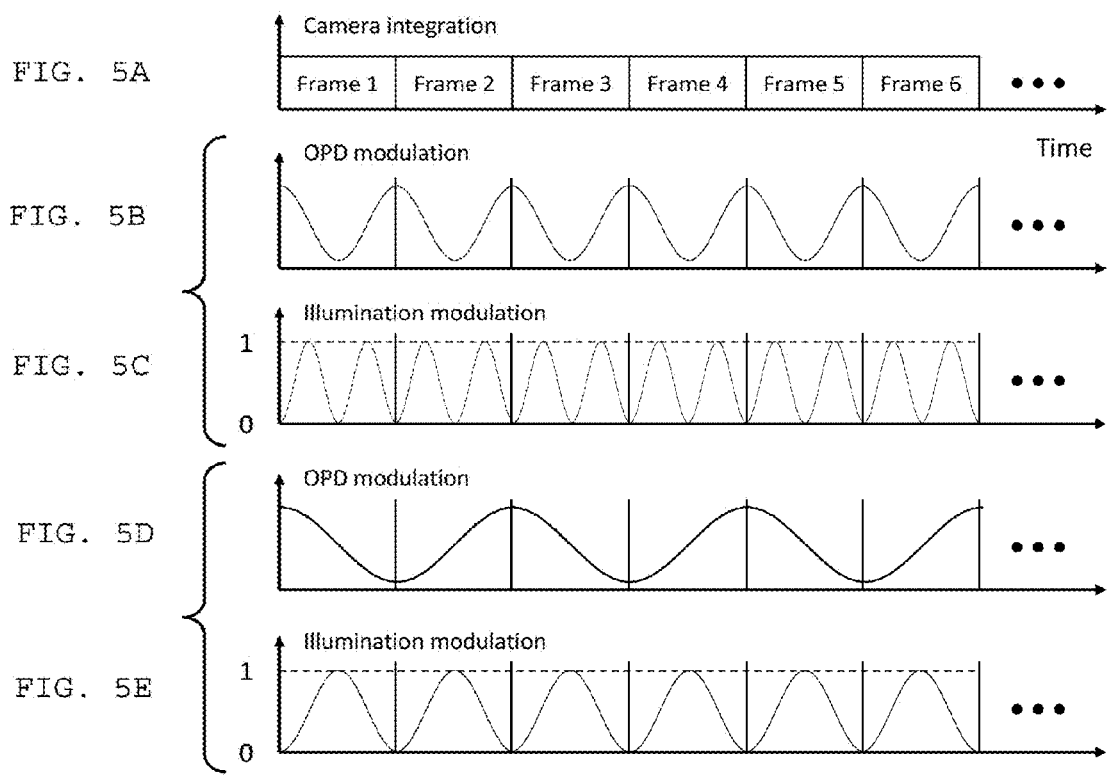
FIGS. 5A-5E show plots of examples of sinusoidal source intensity modulation patterns (FIGS. 5C and 5E), synchronized with the sinusoidal modulation of the optical path (FIGS. 5B and 5D), respectively, relative to the detector frame rate (FIG. 5A).

FIG. 5B show a sinusoidal optical path modulation having a frequency that is the same as the camera frame rate (shown in FIG. 5A), while FIG. 5C shows a sinusoidal intensity modulation that has twice the frequency of the frame rate. FIG. 5D shows an optical path modulation having half the frequency of the frame rate, while FIG. 5E shows a sinusoidal intensity modulation that has the same frequency as the frame rate.

To illustrate the benefit of such intensity modulation, a simulation tool was used to predict contrast reduction for different configurations. The tool involved a numerical model implemented within the Mathcad computer program. The numerical model was used to dissect each camera frame into infinitesimal time periods within which the cavity OPD and source illumination were considered constants. The intensity detected by the sensing element was computed by summing the intensities predicted for each infinitesimal element, where OPD and source illumination change from element to element.

Figure 6:
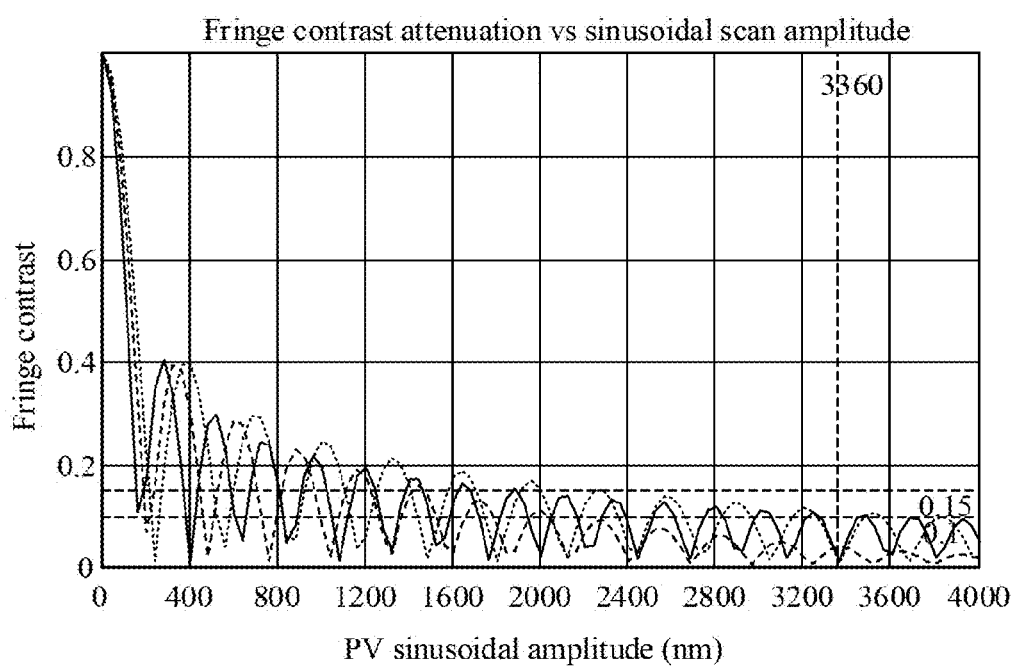
FIG. 6 is a plot of simulated fringe contrast reduction as a function of the peak-valley sinusoidal modulation of the optical path during detector integration for three different wavelengths in the visible spectrum (455 nm—solid line, 550 nm—dashed line, and 625 nm—dotted line).

As a baseline, FIG. 6 shows the residual fringe contrast (on the Y-axis) achieved by sinusoidally modulating an interferometer cavity for three different wavelengths in the visible spectrum (455 nm—solid line, 550 nm—dashed line, and 625 nm—dotted line) as a function of peak-valley (PV) modulation amplitude (in nm) without varying the light intensity. The modulation frequency is equal to the camera frame rate for this simulation. The figure shows a decay of the fringe contrast with increasing modulation amplitude. The PV amplitude 3.36 µm is marked on the plot as a location where contrast is less than 5% of the original fringe pattern contrast for all three wavelengths.

Figure 7:
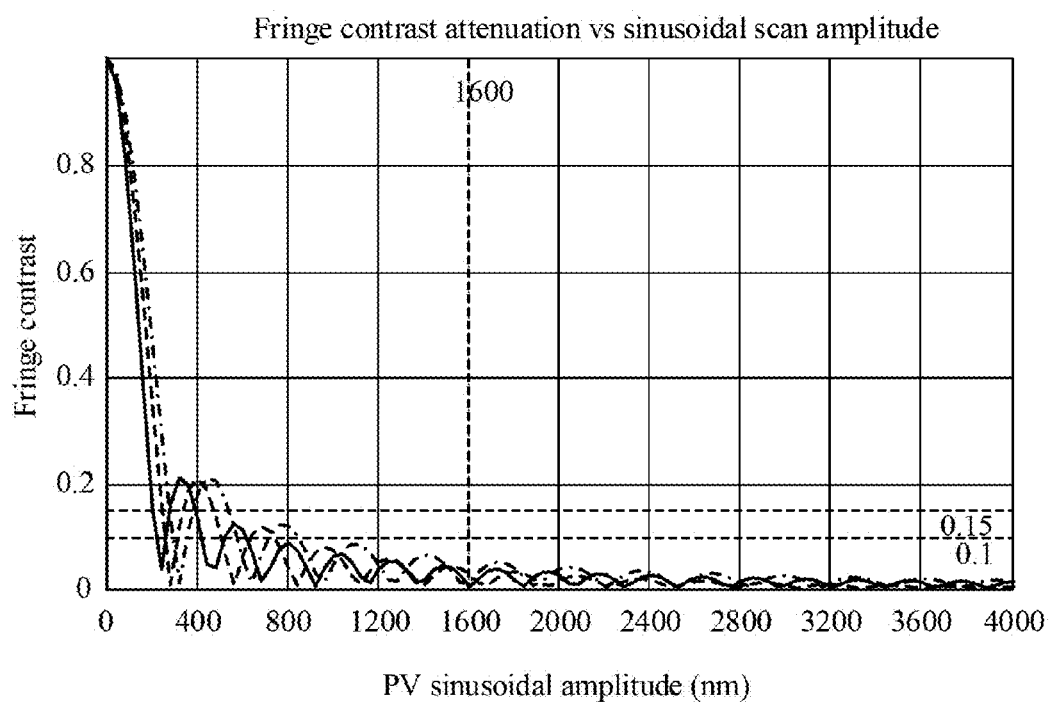
FIG. 7 is a plot of simulated fringe contrast reduction as a function of the peak-valley sinusoidal modulation of the optical path for three different wavelengths in the visible spectrum (455 nm—solid line, 550 nm—dashed line, and 625 nm—dotted line), when the source intensity is also varied sinusoidally during detector integration.

FIG. 7 illustrates the contrast reduction achieved when the source intensity is sinusoidally modulated, synchronously with the optical path modulation during detector integration. The contrast reduction is substantially improved in this case when compared to the plot of FIG. 6. For instance, it is possible to achieve sub-5% residual fringe contrast at roughly half the modulation amplitude that is required when the source intensity is constant.

Figure 8:
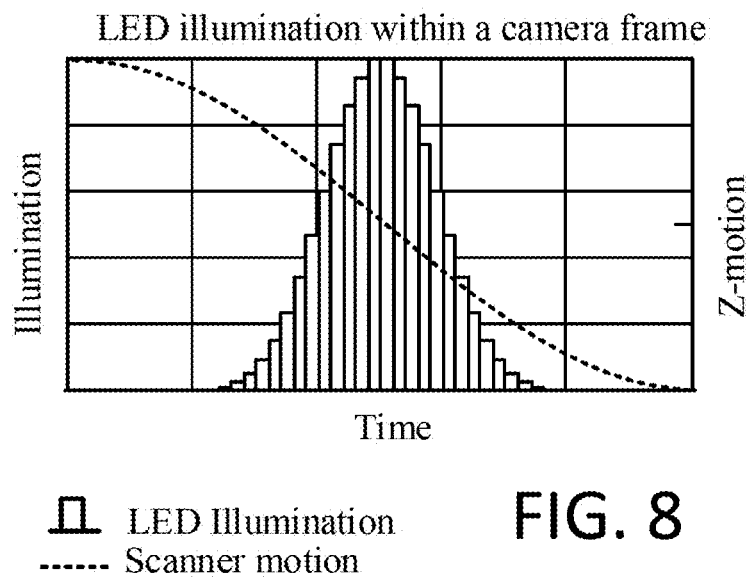
FIG. 8 is a plot of an example intensity modulation pattern (bar chart) and cavity modulation pattern (line chart) for a single detector frame.
Figure 9:
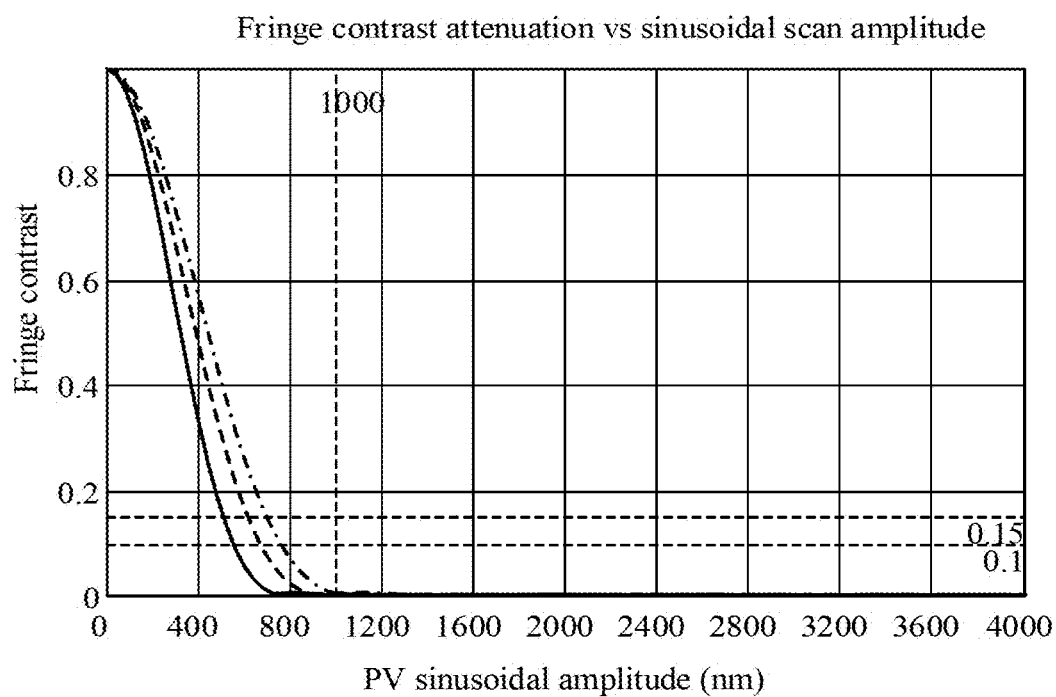
FIG. 9 is a plot of simulated fringe contrast reduction as a function of the peak-valley sinusoidal modulation of the optical path for three different wavelengths in the visible spectrum (455 nm—solid line, 550 nm—dashed line, and 625 nm—dotted line), when the source intensity is varied according to FIG. 8 during detector integration.

Other intensity modulation functions may be used. For example, the illumination pattern shown in FIG. 8 (in this case a positive sinusoidal function raised to the twelfth power), yields the contrast reduction function shown in FIG. 9. The residual fringe contrast is theoretically reduced in this case to less than 1% for all three wavelengths. A further benefit is that the peak-valley modulation is now more than a factor of three smaller than what is required to achieve 5% residual fringe contrast without intensity modulation. This reduction may make it easier to create the required cavity modulation and allows maintaining the sample surface in focus with sub-micron motions.

More generally, the fringe reduction techniques described above are not limited to the few types of intensity modulation functions mentioned in this disclosure. Other intensity modulation functions can be designed for specific trade-offs between sinusoidal OPD modulation amplitude, fringe contrast reduction goal, amount of light integrated by the detector, etc.

In general, source intensity modulation can be achieved in a variety of ways. For example, certain light sources' output can be modulated simply by changing the electrical current or voltage used to drive them (e.g., LEDs or laser diodes). For sources that cannot be directly modulated, a variety of light valves can be used to achieve the desired effect. Examples of light valves that may be used include, for example, fast switching LCD apertures, digital micro-mirrors or other type of programmable spatial light modulators, a rotating polarizer placed in front of a polarized source, and acousto-optic modulators. A variable neutral density filter may also be used.

Reference Leg Compensation

In some embodiments, the fringe-reduced intensity data captured in real-time by the detector are corrected by subtraction of the intensity contribution of the interferometer reference leg (i.e., the reference light) and/or other sources of non-interfering background light in the system. For example, information about the intensity of the source may be captured as part of a periodic calibration of the instrument. For instance, in some embodiments, intensity information may be captured as follows:

(i) Intensity images are recorded at the detector in the absence of a test object, for different levels of illumination, where illumination level is controlled by varying the amount of light produced by the light source. This provides an estimate of the amount of detector signal contributed by the reference leg and internal optics (e.g., reflections from optical elements in the light path). This intensity contribution is generally field-dependent. In some cases it can be approximated by a constant value over the field of view.

(ii) These data are normalized and numerically fitted such that computer code can later generate estimates of the reference leg contribution for any level of illumination in the instrument.

The interference pattern measured at the detector can generally be described as in Eq.(1):

$$I(x,y)=I_{ref}(x,y)+I_{ob}(x,y)+I_{mod}(x,y)\cos[\phi(x,y)] \quad (1)$$

where $I_{ref}$ is the intensity contribution from the reference leg (and background light from other optical components in the instrument), $I_{ob}$ is the intensity contribution from the test object surface, $I_{mod}$ is the modulation amplitude of the interference pattern and $\phi(x, y)$ is the phase distribution of the interferogram. The (x,y) dependence denotes the variation of these various quantities as a function of lateral position within the field-of-view.

With the modulation term eliminated from the image, e.g., using the fringe reduction techniques described above, the detected image then takes the form of:

$$I_{meas}(x,y)=I_{ref}(x,y)+I_{ob}(x,y) \quad (2)$$

Using the calibration information described earlier, a computer processor in communication with the detector generates an estimate of the contribution $I_{ref}$, which is then numerically subtracted from the measured intensity $I_{meas}$, to finally yield an estimate of the quantity of interest $I_{ob}$, the fringe-free image of the sample surface.

Sample Reflectivity Estimate for Light Level Control

In some embodiments, the estimate of the intensity contribution from the object surface ($I_{ob}$) is used to predict the maximum signal amplitude that the detector would see when sampling the interference pattern as part of a metrology data acquisition (where the fringe-free mechanism is disabled). This maximum amplitude is for example computed by assuming maximum interference contrast:

$$I_{maximum}(x,y)=I_{ref}(x,y)+I_{ob}(x,y)+2\sqrt{I_{ref}(x,y)I_{ob}(x,y)} \quad (3)$$

The map $I_{maximum}$ is then compared to the maximum signal that can be recorded by the detector without saturation. An optimum light level is derived from the current light level and the measured intensities:

$$LightLevel_{new} = LightLevel_{old}\frac{DynamiRange}{\max(I_{maximum})} \quad (4)$$

where DynamicRange is the maximum signal than can be recorded with the detector. For instance, DynamicRange is expressed as a number of digital counts or gray levels. The intensity values are similarly computed in units of digital counts.

The benefit of this procedure is the acquisition of metrology data taking advantage of the full dynamic range of the detector, while avoiding saturation at any location within the field-of-view. The procedure may be automated and does not necessarily require user input, which on the one hand simplifies the user interaction with the instrument and on the other reduces the risk of improperly set light level.

Utilizing the described techniques, an instrument may display live fringe patterns to the user while briefly engaging fringe-free imaging for the purpose of automatically setting light level when the user initiates a metrology data acquisition.

EXAMPLES

Figure 10A:
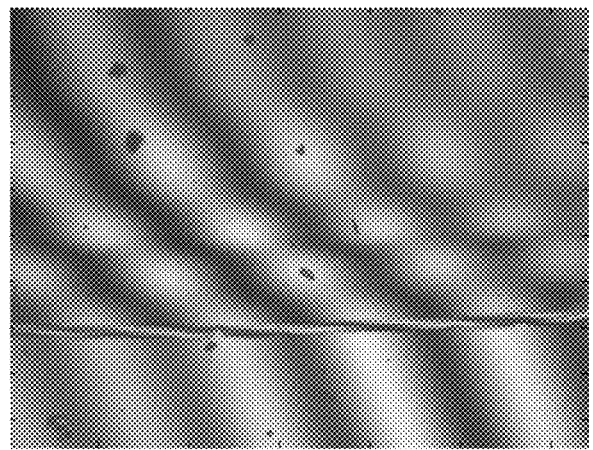
FIG. 10A is an image snapshot of a thin film sample observed with a white-light interferometer.
Figure 10B:
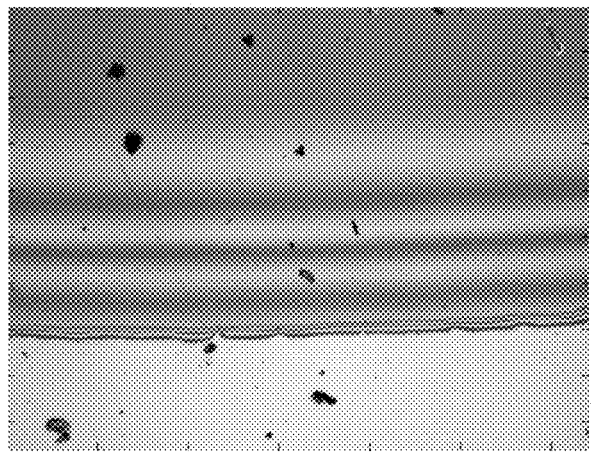
FIG. 10B is an image of the same location shown in FIG. 10A with fringe contrast reduction, showing patterning related to the presence of the thin film.

FIG. 10A shows a snapshot of an image of a thin film oxide on a silicon substrate observed with a white-light interferometer (the image was a color image but converted to black and white for the purposes of this application). The upper region of the image is the oxide film with a thickness gradient progressing from almost zero to about 1 micron. The interference phenomenon creates a diagonal set of colored fringes that mostly hide features of the sample. Next, the optical path in the interferometer is sinusoidally modulated synchronously with a sinusoidal variation of the illumination intensity during the integration time of the camera. The scan modulation frequency is half of the camera frame rate while the intensity modulation frequency is equal to the camera frame rate. The calibrated, known intensity contribution from the reference leg of the interferometer is subtracted from the resulting raw image to yield the image of FIG. 10B where the contrast of the interference pattern is substantially reduced. It is then possible to observe another fringe pattern in the form of horizontal bands that correspond to a variation of the thickness of a transparent film on the sample. This illustrates a benefit of the fringe reduction where the interference pattern, when present, masks or hides a feature of interest on a sample.

Figure 11A:
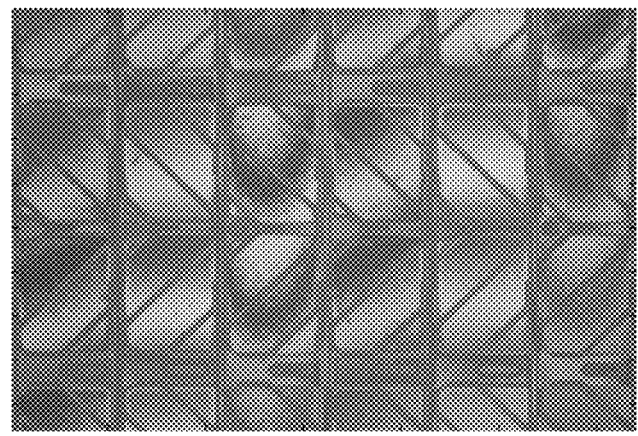
FIG. 11A is an image snapshot of an array of color filters observed with a white-light interferometer.
Figure 11B:
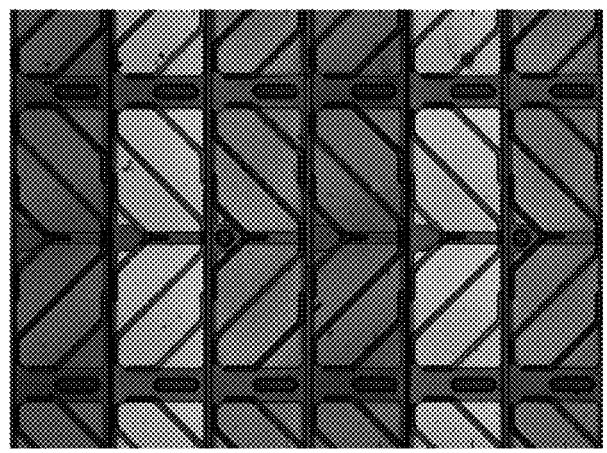
FIG. 11B is an image of the same location as shown in FIG. 11A with fringe contrast reduction.

FIGS. 11A and 11B illustrate a similar benefit when looking at an image of an array of color filters for a liquid crystal display with a white-light interferometer. FIG. 11A shows a conventional image of the fringe pattern while FIG. 11B shows the image that is seen after applying fringe reduction in the same manner as applied for the prior example (see FIGS. 10A and 10B). In this case the user can more easily identify the location of the three types of color filters present on the sample. Again, the original color image was converted to grayscale for the purposes of this application.

Figure 12A:
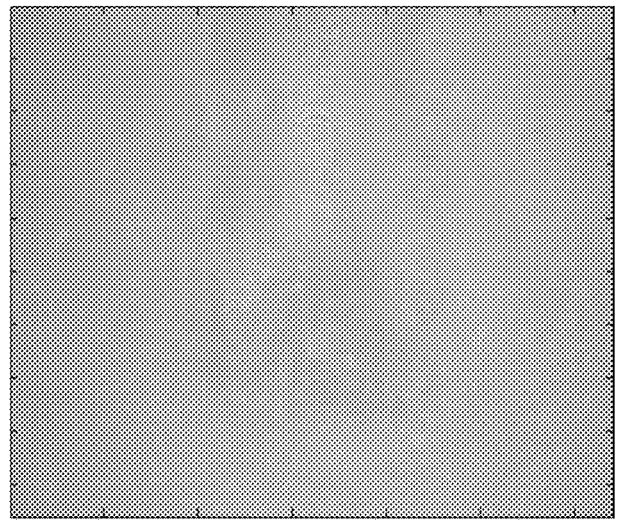
FIG. 12A is an image snapshot of printed ink observed with a white-light interferometer.
Figure 12B:
FIG. 12B is an image of the same location as shown in FIG. 12A with fringe contrast reduction.

FIGS. 12A and 12B illustrate a case where the sample reflectivity is much lower than that of the interferometer reference leg. It follows that the direct interferometric image shown in FIG. 12A has very poor contrast and makes it difficult to recognize features of interest. Using the fringe reduction technique as for the prior examples, the image shown in FIG. 12B demonstrates that the details in this sample are much easier to see.

The three above examples illustrate certain benefits of the disclosed fringe reduction techniques. These techniques may, for example, allow for the presentation to a user of an interferometry system a real-time image of the sample under test that for all intent and purposes looks like it was acquired with a non-interferometric imaging instrument, such as a camera or conventional wide field microscope. This significantly enhances the accessibility of the instrument to the non-expert user, while preserving a metrology capability that can only be achieved with interferometers.

While a number of embodiments are described. Other embodiments are also possible. For example, while FIG. 1 shows a Mirau type interferometer, the techniques described above may be applied other types of interferometer as well, such as Michelson interferometers.

Other embodiments are in the following claims.

What is claimed is:

1. A method, comprising:
   directing test light and reference light along different optical paths, where a test object is positioned in a path of the test light and the test and reference light are derived from a common light source;
   forming an image of the test object on a multi-element detector by directing test light from the test object to the detector;
   overlapping the reference light with the test light on the multi-element detector;
   detecting an intensity of the overlapped test and reference light with the elements of the multi-element detector, the intensity being detected at a frame rate of the multi-element detector; and
   modulating an optical path difference (OPD) between the test and reference light at the detector while detecting the intensity of the overlapped test and reference light,
   wherein the OPD is periodically modulated so that the OPD varies during the detection of a single frame of the multi-element detector by an amplitude sufficient to reduce a contrast of fringes in a spatial interference pattern formed by overlapping test and reference light at the multi-element detector compared with a contrast of fringes in the interference patterned formed when the OPD is zero.

2. The method of claim 1, further comprising providing a fringe-free image of the test object based on the detected intensity of the overlapped test and reference light.

3. The method of claim 2, wherein providing the image comprises reducing a contribution of the reference light to the image.

4. The method of claim 1, further comprising providing an image of the test object having a fringe contrast reduced by a factor of 2 or more relative to an image of the test object formed without modulating the OPD between the overlapping test and reference light.

5. The method of claim 1, wherein the image of the test object is a color image.

6. The method of claim 1, wherein the OPD is modulating by moving at least one element in an optical apparatus used to direct the test and reference light.

7. The method of claim 1, wherein the OPD is modulated by varying a wavelength of the test and reference light at the detector.

8. The method of claim 1, wherein the OPD is modulated periodically while detecting the intensity of the overlapping test and reference light.

9. The method of claim 8, wherein the periodic modulation of the OPD is synchronized with the frame rate.

10. The method of claim 8, wherein the frame rate is an integer multiple of a frequency of the periodic modulation of the OPD.

11. The method of claim 1, wherein the OPD is modulated with a saw tooth, sinusoidal or triangular waveform.

12. The method of claim 1, further comprising modulating an intensity of the test and reference light while modulating the optical path difference between the test and reference light.

13. The method of claim 12, wherein the intensity is modulated periodically while detecting the intensity of the overlapping test and reference light.

14. The method of claim 1, further comprising detecting an intensity of the overlapped test and reference light with the elements of the multi-element detector while varying the OPD to acquire an interference signal for each of the detector elements, and determining information about the test object based on the interference signals.

15. A method, comprising:
    directing test light and reference light along different optical paths, where a test object is positioned in a path of the test light and the test and reference light are derived from a common light source;
    forming an image of the test object on a multi-element detector by directing test light from the test object to the detector;
    overlapping the reference light with the test light on the multi-element detector;
    detecting an intensity of the overlapped test and reference light with the elements of the multi-element detector, the intensity being detected at a frame rate of the multi-element detector; and
    modulating an optical path difference (OPD) between the test and reference light at the detector while detecting the intensity of the overlapped test and reference light,
    wherein the OPD is modulated so that the OPD varies during the detection of a single frame of the multi-element detector by an amplitude sufficient to reduce a contrast of fringes in a spatial interference pattern formed by overlapping test and reference light at the multi-element detector compared with a contrast of fringes in the interference patterned formed when the OPD is zero,
    wherein the OPD is modulated by an amount in a range from about 200 nm to about 5 microns during the modulating.

16. A method, comprising:
    directing test light and reference light along different optical paths, where a test object is positioned in a path of the test light and the test and reference light are derived from a common light source;
    forming an image of the test object on a multi-element detector by directing test light from the test object to the detector;
    overlapping the reference light with the test light on the multi-element detector;
    detecting an intensity of the overlapped test and reference light with the elements of the multi-element detector, the intensity being detected at a frame rate of the multi-element detector; and
    modulating an optical path difference (OPD) between the test and reference light at the detector while detecting the intensity of the overlapped test and reference light,
    wherein the OPD is modulated so that the OPD varies during the detection of a single frame of the multi-element detector by an amplitude sufficient to reduce a contrast of fringes in a spatial interference pattern formed by overlapping test and reference light at the multi-element detector compared with a contrast of fringes in the interference patterned formed when the OPD is zero, wherein the intensity is modulated periodically while detecting the intensity of the overlapping test and reference light, and the periodic modulation of the intensity is synchronized with a periodic modulation of the OPD.

17. The method of claim 16, wherein the periodic intensity modulation and the periodic OPD modulation are synchronized so that a maximum rate of change of the OPD modulation corresponds to a maximum intensity.

18. The method of claim 17, wherein the periodic intensity modulation and the periodic OPD modulation are synchronized so that a minimum rate of change of the OPD modulation corresponds to a minimum intensity.

19. An interferometry system, comprising:
a light source module;
a stage for supporting a test object;
a multi-element detector configured to acquire frames at a frame rate;
an imaging interferometer configured to derive test light and reference light from the light source module, and direct the test light and reference light along different optical paths where test light illuminates the test object while supported by the stage, to form an image of the test object on the multi-element detector with the test light, and to overlap the reference light with the test light on the multi-element detector,
the imaging interferometer or the stage comprising an actuator configured to modulate an optical path difference (OPD) between the test light and reference light at the multi-element detector; and
an electronic controller in communication with the actuator and the multi-element detector, the electronic controller programmed to cause the actuator to periodically modulate the OPD between the test and reference light at the detector while the multi-element detector detects an intensity of the overlapped test and reference light,
wherein the OPD modulation is such that the OPD varies during the detection of a single frame of the multi-element detector with an amplitude sufficient to reduce a contrast of fringes in a spatial interference pattern formed by the overlapping test and reference light at the multi-element detector compared with a contrast of fringes in the interference patterned formed when the OPD is zero.

20. The system of claim 19, wherein the light source module is in communication with the electronic controller which is programmed to cause the light source module to modulate an intensity of the test and reference light while the actuator modulates the OPD between the test and reference light.

21. The system of claim 20, wherein the light source module comprises a light source and the electronic controller modulates the intensity of the test and reference light by modulating an intensity of light emitted from the light source.

22. The system of claim 19, wherein the imaging interferometer is an interference microscope.

23. The system of claim 22, wherein the interference microscope comprises an objective and the actuator is configured to move the stage relative to the objective.

24. A method, comprising:
directing test light and reference light along different optical paths, where a test object is positioned in a path of the test light and the test and reference light are derived from a common light source;
forming an image of the test object on a multi-element detector by directing test light from the test object to the detector;
overlapping the reference light with the test light on the multi-element detector;
detecting an intensity of the overlapped test and reference light with the elements of the multi-element detector, the intensity being detected at a frame rate of the multi-element detector; and
modulating an optical path difference (OPD) between the test and reference light at the detector while detecting the intensity of the overlapped test and reference light,
wherein the OPD is modulated so that the OPD varies during the detection of a single frame of the multi-element detector by an amplitude sufficient to reduce a contrast of fringes in a spatial interference pattern formed by overlapping test and reference light at the multi-element detector compared with a contrast of fringes in the interference patterned formed when the OPD is zero,
wherein the OPD is modulated randomly while detecting the intensity of the overlapping test and reference light.

* * * * *